(12) United States Patent
Chuah

(10) Patent No.: US 8,668,126 B2
(45) Date of Patent: Mar. 11, 2014

(54) SELF WRAPPED GADGET HOLDER FOR STROLLER

(76) Inventor: Khai Gan Chuah, Austin, TX (US)

(*) Notice: Subject to any disclaimer, the term of this patent is extended or adjusted under 35 U.S.C. 154(b) by 271 days.

(21) Appl. No.: 12/976,506

(22) Filed: Dec. 22, 2010

(65) Prior Publication Data

US 2012/0118929 A1    May 17, 2012

Related U.S. Application Data

(60) Provisional application No. 61/412,394, filed on Nov. 11, 2010.

(51) Int. Cl.
*B60R 11/00* (2006.01)

(52) U.S. Cl.
USPC .......... 224/572; 224/409; 224/436; 24/16 PB

(58) Field of Classification Search
USPC ....... 24/17 A, 3.8, 16 PB; 224/409, 400, 401, 224/165, 219, 220, 221, 222, 267; 206/101, 206/148, 575, 576, 463, 572, 0.5; 53/399; 248/309.1; 362/389, 390, 431
See application file for complete search history.

(56) References Cited

U.S. PATENT DOCUMENTS

| | | | | |
|---|---|---|---|---|
| 2,505,044 A | * | 4/1950 | Heinrich | 224/176 |
| 3,475,716 A | * | 10/1969 | Laig | 439/369 |
| 4,182,005 A | * | 1/1980 | Harrington | 24/16 PB |
| 4,229,924 A | * | 10/1980 | Teachout, Sr. | 53/399 |
| 4,526,756 A | * | 7/1985 | Wong | 422/566 |
| 4,631,783 A | * | 12/1986 | Hayashi | 24/16 PB |
| 5,024,402 A | * | 6/1991 | Hamel | 248/52 |
| 5,154,506 A | * | 10/1992 | Leard | 362/103 |
| 5,522,122 A | * | 6/1996 | Turchick et al. | 24/335 |
| 5,692,268 A | * | 12/1997 | Case | 24/16 PB |
| 5,899,370 A | * | 5/1999 | Bould | 224/175 |
| 6,073,315 A | * | 6/2000 | Rasmussen | 24/16 PB |
| 6,206,258 B1 | * | 3/2001 | Calder | 224/420 |
| 2007/0102461 A1 | * | 5/2007 | Carstens | 224/222 |
| 2008/0047990 A1 | * | 2/2008 | Morgan et al. | 224/222 |
| 2010/0200627 A1 | * | 8/2010 | Shen | 224/222 |
| 2011/0057003 A1 | * | 3/2011 | Wysocki | 224/222 |

\* cited by examiner

*Primary Examiner* — Nathan J Newhouse
*Assistant Examiner* — Phillip Schmidt

(57) ABSTRACT

The present invention relates to the means for attaching gadget on a stroller using an elastic holder to wrap around the stroller. Using the elastic self-wrapped holder, the lighting device or gadget is easily and conveniently secured on the stroller without any tool, thereby saving time and effort of parents. The elastic self-wrapped holder does not distort or damage the stroller. The elastic self-wrapped holder is versatile and can firmly secure a lighting device or gadget to any parts of stroller. The elasticity of the material used for the holder can conform to gadget of various sizes and shapes thereby firmly grip and tightly fit the gadget.

12 Claims, 3 Drawing Sheets

SELF WRAPPED GADGET HOLDER FOR STROLLER

CROSS-REFERENCE TO RELATED APPLICATIONS

This application claims priority to U.S. Provisional Application Ser. Nos. 61/412,394 filed on Nov. 11, 2010.

BACKGROUND OF THE INVENTION

1. Field of the Invention

The present invention relates generally to an apparatus for attaching and securing accessories such as lighting devices onto baby carriages and strollers. This is accomplished by utilizing elastic material to form a tight encasement around the device and the rest of the elastic material is stretched, securely wrapped around object such as, but not limited to, rod, handle bar, tubing, without damaging or changing the gross integrity of the stroller and other vehicles.

2. Discussion of Related Art

In recent years, strollers are being used more frequently during dawn and nighttime for outdoor activities such as jogging. Stroller lighting device is designed to serve the purposes of improving safety of pedestrian with stroller by increasing the visibility of the stroller under poor lit condition to incoming traffic as well as lighting the pathway for the user. The term "lighting device" is used herein to refer to either flashlight or safety light.

Installing such accessory on a stroller has proven to be challenging because today's stroller comes with different functionality and style. The variety of designs including lightweight stroller, travel system stroller with infant ear seat, jogger stroller, umbrella stroller, stand-on stroller, lifestyle stroller, all terrain stroller, baby carriage and etc, tends to create obstructions to the usage of the device if the device is fixed in one position.

For example, the lighting device may be functional when placed on the handle bar of a stroller but when an infant car seat is added on the stroller, the path of light of the device is being obstructed by the car seat. Another type of stroller that toggles between child facing towards and away from user will encounter the beam of light shining directly at the child if the lighting device is fixed at one position. Under these circumstances, traditional fastener of nuts and bolts to secure the device at one position is not practical. Parents will constantly require using tools to relocate the device or to remove the device entirely. Furthermore, the clamps and/or adhesives often cause permanent undesired markings or damages to the object it is secured to.

To avoid this impairment, the invention provides an easily and practical solution to relocating the accessory. The invention makes the installation and removal of the device a matter of few seconds, perfect for a busy and always-on-the-go parent.

Another problem with the traditional method is the adaptability of the device being secured to any shapes and sizes of the stroller. For instance, the typical cylindrical shaped handle bar or frame of the strollers where one would secure the lighting device to, is now expanded to oblong, multi-edged, multi-angled, curved, coned and even bulb shaped, for ergonomic and fashionable reasons. Traditional clamp mounting in this case will not work, as it damages the spot it is clamped to. Other methods of securing that uses material such as cloth or Velcro wraparounds offers a solution to this problem, but often is ill-fitted and do not completely grip the object that have smooth surface, causing gadgets to slide undesirably.

Because of its elastic structure, the invention offers a simple yet practical solution by the ability to securely fasten to any kind of solid surface of any shapes and sizes.

In addition, the elastic material used for the invention costs less than other material, cost less to manufacture, and is safer as children product since there is practically no sharp edges or entrapment endangerment.

SUMMARY OF THE INVENTION

This invention offers to its user an easier way for installing lighting devices such as safety light and flashlight onto strollers. It can be installed single handedly. This is especially helpful for parents who are often multitasking. The gadget holder with self-wrapped attachment feature is also very easily removed and be relocated from one position to another when desired, making it very portable to be used on many other objects. In addition, its elastic structure can accept lighting devices of different shapes, hence allow both flashlight and safety light to be used interchangeably when needed. Therefore, parents no longer need to install both lights since flashlight and safety light to serve different purposes.

With the elastic tension stretchable attribute, the sell-wrapped elastic gadget holder negates the use of clamps and adhesives, thereby, retains the original integrity of the object the gadget holder is secured to. Unlike Velcro, the elasticity of the gadget holder provides non-slip grips on the object, even on smooth surfaces, making it an optimal material for securing onto any solid surfaces.

The self-wrapped elastic gadget holder comprises of stretchable material which encases a lighting device. Because of its stretchable attribute, the lighting device is not limited to where it is positioned. The lighting device can be designed to be placed anywhere along the elastic band.

To attach it to a stroller handle bar or other objects, one end of the elastic holder is stretched to wrap around the handle bar and anchored back on the elastic holder by any type of connector or locking mechanism such as hook-and-loop. A button, Velcro, knob or plastic buckle end can also be used, if so desired.

The self-wrapped elastic gadget holder is also easy to manufacture as it can essentially be one complete piece of holder having all the described features, as opposed to having multiple plastic or metal components on traditional holder. Conversely, the lighting device and the holder can also be manufactured separately and assembled later to form a complete lighting system for stroller. In any case, the ease of manufacturing significantly reduces the cost of manufacturing. The holder can also be utilized to grasp other gadgets such as GPS navigation system, jogging speedometer, child's cup or medical pill case and other accessories. The term "gadget" is used herein to refer to any device that the holder can grasp on to become one entity as a consumer product itself.

The holder can be installed on many objects/vehicles with a rod, handle bar or frame such as wheelchairs, scooters, carts, walking devices, children ride-on toys, bicycles, boat, outdoor gears.

BRIEF DESCRIPTION OF THE DRAWINGS

FIG. 1 show the body which holds the gadget is located at the end of the holder.

DETAILED DESCRIPTION

Figure 1:
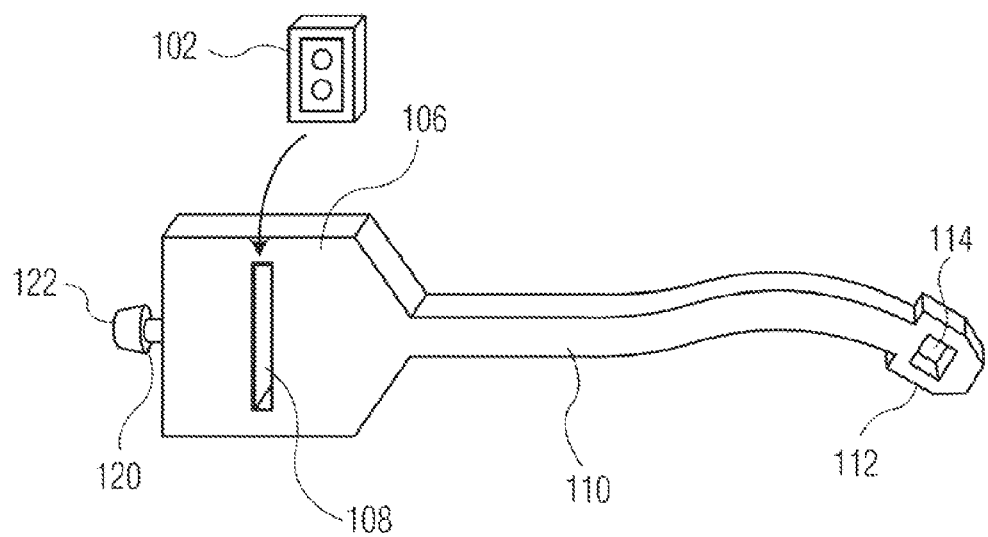
FIG. 1 is a perspective view of the holder having the lighting device according to the present invention.

FIG. 1 illustrates details of the elastic gadget holder according to an embodiment of the present invention. The said holder comprises three major sections: body (106), elastic band (110), and a locking mechanism with a loop connector (112) and anchor (122). The said body consists of a compartment (108), of which, a gadget (102) can be encased firmly. Continued on the holder is the elastic band (110) with a loop connector (112) at the end. The said hand is stretchable to wrap around an appendage of an object such as tubing, pole and handle of the strollers (115). The gadget (102) in this case is a LED (Light-Emitting Diode) flashlight or safety device. For the purpose of clarity, the term "device" and "gadget" will be used interchangeably throughout the application.

The preferred embodiment of the locking mechanism is a loop connector (112) at one end of the holder and the anchor (122) on the other end. The said loop connector consists of a hole or loop (114) that is also stretchable to various sizes and shapes in order to secure onto the anchor. The said anchor (122) consists of a surface (120) that is shaped to enable the said loop connector (112) to latch on and not slip off. The said anchor is preferable childproof as it is used safely on a child gears or toys. The said anchor is located at one side of the said body (106). As an alternate to the preferred embodiment, the said anchor can be placed at other locations on the holder or be attached to other components such as on the gadget (102), instead of the holder itself. These variations are further discussed in later paragraphs.

It is to be noted that the entire holder can be manufactured as one piece of elastic band, or as multiple components. Due to the stretchable material, the said body (106), loop connector (112), loop (114), anchor (122), compartment (108) and band member (110) can be manufactured into various sizes or shapes to fit the functionality of the gadget.

Since the purpose of the said anchor (122) is as part of the locking mechanism, it is not limited to being childproof. Hook, snap-on button, Velcro, knob or buckle, to name a few, can also be used, depending on the desired locking mechanism.

As shown in FIG. 1, the band (110) of the holder consists of a loop connector (112) at the first end of the said holder. The said band, similar to the other component of the holder is stretchable. The loop (114) of the said loop connector (112) can be of various sizes, shapes and lengths to improve stretch ability and ease of securing onto the anchor (122).

The elastic gadget holder depicted in FIG. 1 comprises of a body (106), of which the gadget (102) is encased firmly. The elasticity of the said holder allows the said body to stretch and grab the gadget (102) so that the said gadget can fit firmly in a compartment (108). As shown in FIG. 1, the placement of the said body (106), of which the gadget (102) is encased firmly is at the one end of the holder. Alternative to the body (106) being at the end of the holder, the said body (106) can be designed to be placed at any position of the said holder.

Figure 2:
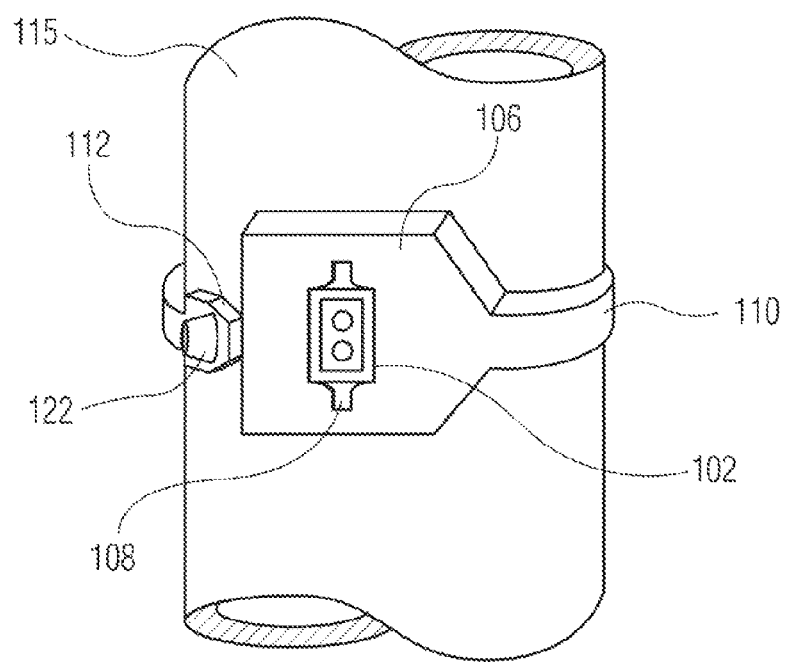
FIG. 2 is a perspective view of the holder described in FIG. 1 wrapped around a frame of a stroller.

FIG. 2 illustrates an example of how the holder would secure on an appendage of the stroller based on FIG. 1 example. In this example, the gadget (102) is inserted into the compartment (108) of the body (106). The elastic hand (110) of the said holder is stretched and wrapped around the appendage of tube or frame of the stroller (115). The loop connector (112) on the said band (110) is then secured onto the anchor (122) such as knob, button, buckle, or Velcro.

Figure 3:
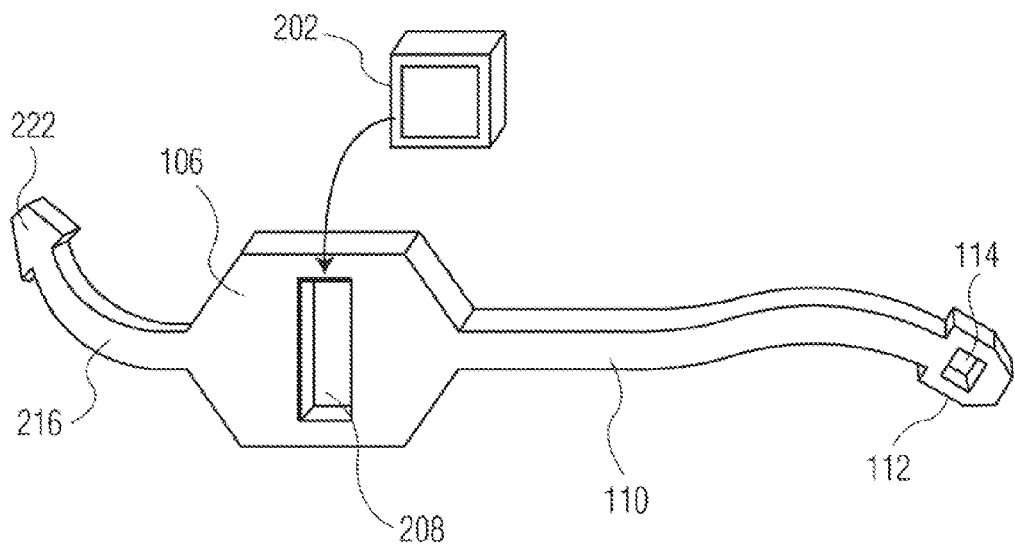
FIG. 3 shows a perspective view of an alternate embodiment of the holder of which the body that holds the gadget is located at a position other than at the end of the holder. Two bands and are extended, each along side of the body respectively.

FIG. 3 shows a slight variation to the first embodiment illustrated in FIG. 1. Instead of being at the end of the holder, the body (106) of the gadget holder is at any other position along the band. Two elastic bands (110) and (216) are extended, each along both sides of the body (106) respectively. At the ends of the bands are the components of the locking mechanism for the holder. The first band (110) with a loop connector (112) and the second band (216) with a hook connector (222). The said hook connector replaces the anchor (122) described on the first embodiment in FIG. 1. To show variation, the gadget (202) is of a different size and shape than previous gadget (102). Thus, the compartment (208) is stretched to a different size to fit the said gadget (202).

Figure 4:
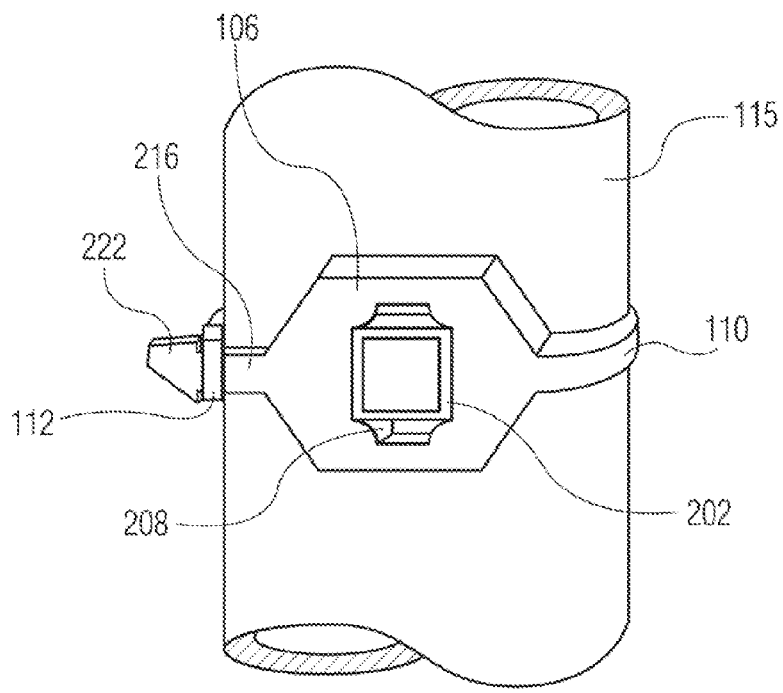
FIG. 4 is a perspective view of the holder described in FIG. 3, wrapped around a frame of a stroller.

FIG. 4 illustrates an example of how the holder would secure on an appendage of the stroller based on FIG. 3. In this example, the gadget (202) is inserted into the compartment (208) of the body (106), two elastic bands (110) and (216) of the holder are stretched and wrapped around the appendage of tube or frame of the stroller (115). The ends of the said bands are connected by means of a locking mechanism. In this illustration a knob and loop method is described. Different types of connectors such as button, buckle, Velcro or hook, can also serve as locking mechanism. Due to the stretchable material, the said compartment (208), band (216) and hook connector (222) can be manufactured into various sizes or shapes to fit the shape and functionality of the gadget (202).

Figure 5:
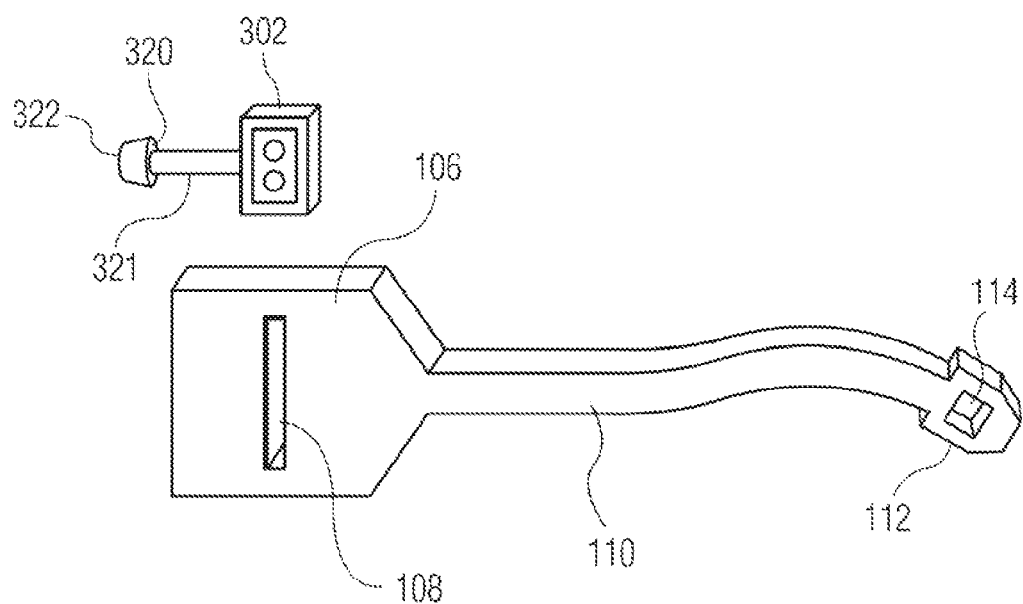
FIG. 5 is a perspective view showing an alternate embodiment of the holder, of which, the gadget itself provides an anchor as part of a locking mechanism of the holder.

FIG. 5 shows an alternate embodiment of the gadget holder, of which, the anchor (322) is part of the gadget (302), instead of the said holder. To show variation, the gadget (302) is of a different size and shape than previous gadget (102). The anchor (322) is attached to the surface of gadget or gadget casing, via an extension (321). Alternatively, the said anchor can also be the gadget (302) or gadget casing itself. For the adaptation to a children product, the anchor can also be a childproof locking mechanism for safety purposes. The said anchor (322) consists of a surface (320) shaped to hold the loop connector (112) as part of the locking mechanism.

Figure 6:
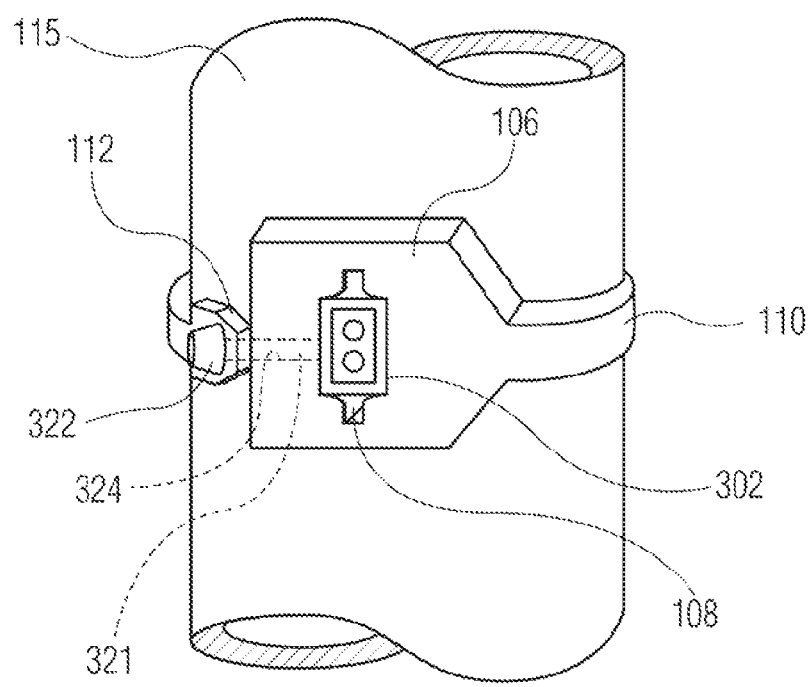
FIG. 6 is a perspective view of the holder described in FIG. 5, wrapped around the frame of a stroller.

FIG. 6 illustrates an example of how the alternate embodiment of the gadget holder described in FIG. 5 is secured on an appendage of the stroller. The gadget (302) with said anchor (322) is inserted into the compartment (108) of the body (106). The said anchor on the gadget is projected out via an opening (324) at body (106) of the elastic holder. The elastic band (110) of the holder is stretched and wrapped around the appendage of tube or frame of the stroller. The loop connector (112) of the elastic hand is then secured on the projected said anchor (322).

The invention is patented with intent to be utilized on a stroller. However, it may be suitably utilized for objects such as wheelchairs, scooter, walking device, children ride-on toys, bicycle, boat, outdoor gears or any other objects with rods, bars and tubular appendages, for the purpose of easy attachment.

Gadgets classified as (102), (202) and (302) include but not limited to safety lights, flashlight, electronic devices and other accessories for strollers, bicycles and outdoor vehicles.

Having disclosed at least one embodiment of the present invention, various adaptations, modifications, additions, and improvements will be readily apparent to those of ordinary skill in the art. Such adaptations, modifications, additions and improvements are considered part of the invention which is only limited by the several claims attached hereto.

The invention claimed is:

1. A holder for a device comprising:
    a body composed of an elastic material, the body having a front with a first opening, a back opposite the front, and a compartment formed integrally therein and a second opening extending from the compartment between the front and back, the compartment having interior walls being adapted to stretch and receive the device to firmly maintain the device within the compartment;
    an anchor which is unitarily formed with at least a part of the device and extends therefrom, the anchor extending through the second opening when the device is received within the compartment; and
    a loop connector coupled to the body, the loop connector having a loop hole for engaging the anchor wherein the loop connector extends from, and is integrally formed with the body, wherein the body, anchor, and loop connector, in use, operate to attach and secure the device to a structure.

2. The holder according to claim 1, wherein the device is a lighting device.

3. The holder according to claim 1, wherein the device is a gadget casing for engaging a gadget.

4. The holder according to claim 1, wherein the device is a gadget.

5. The holder to claim 1 can be of multi- or solid colors, sizes and shapes.

6. A holder, as set forth in claim 1, wherein the compartment has an interior wall, the compartment being configured to encase the device such that interior wall substantially surrounds sidewalls of the device.

7. A holder, as set forth in claim 6, wherein the compartment is configured to encase the device such that a surface of the device is aimed in a first direction, wherein the anchor extends past the body in a second direction, the second direction being different from the first direction.

8. A holder for a lighting device the lighting device having at least one surface from which light is emitted, comprising:
    a body composed of an elastic material, the body having a front with a first opening, a back opposite the front, and a compartment formed integrally therein and a second opening extending from the compartment between the front and back, the compartment having interior walls, the walls being adapted to stretch and receive the lighting device to firmly maintain the lighting device within the compartment;
    an anchor which is unitarily formed with at least a part of the lighting device and extends therefrom, the anchor extending through the second opening when the lighting device is received within the compartment connecting device coupled to the body; and
    a loop connector coupled to the body, the loop connector having a loop hole for engaging the anchor wherein the loop connector extends from, and is integrally formed with the body, wherein the body and the connector connectors, in use, are wrapped around an appendage of a structure and generally centered around the axis to attach and secure the gadget to the structure such that the lighting device is maintained within the compartment and the at least one surface is aligned with the first opening such that light is allowed to be emitted away from the holder in a direction generally away from the axis of the appendage.

9. A holder, as set forth in claim 8, wherein the body, hook connecting device and loop connector are unitarily formed.

10. A holder, as set forth in claim 8, wherein the lighting device is maintained within the compartment such that light is emitted away from the holder in a direction generally perpendicular to the axis of the appendage.

11. An apparatus, comprising:
    a device having an anchor which is unitarily formed with at least a part of the gadget and extends therefrom;
    a holder for removably coupling the device to an appendage of a structure, the appendage having an axis, the holder having a body and a loop connector; the body composed of an elastic material, the body having a front with a first opening, a back opposite the front, and a compartment formed integrally therein and a second opening extending from the compartment between the front and back, the compartment having interior walls, the walls being adapted to stretch and receive the gadget to firmly maintain the gadget within the compartment, the anchor extending past the side of the body when the lighting device is received within the compartment, the holder includes a loop connector coupled to the body, the loop connector having a loop hole for engaging the anchor, the loop connector extends from, and is integrally formed with the body, wherein the body and the connector, in use, are wrapped around the appendage and generally centered around the axis to attach and secure the gadget to the structure such that the gadget is maintained within the compartment.

12. An apparatus, as set forth in claim 11, wherein the device is a lighting device.

* * * * *